UNITED STATES PATENT OFFICE 2,643,964

METHOD FOR IMPROVING THE ADHESION OF ORGANOPOLYSILOXANES TO SOLID SURFACES

Robert Smith-Johannsen, Schenectady, N. Y., assignor to General Electric Company, a corporation of New York No Drawing. Application October 14, 1950, Serial No. 190,241

32 Claims. (Cl. 154—139)

This invention is concerned with improving the adhesion of silicone rubbers to solid surfaces. More particularly, the invention relates to a process for improving the adhesion to a solid surface of an organopolysiloxane convertible, e. g., by heat, to the solid, elastic state and containing less than 0.2 mol per cent copolymerized mono-organosiloxane, e. g., monomethylsiloxane, which process comprises (1) treating the said surface with a composition comprising a hydrolyzable organosilicate compound corresponding to the general formula:

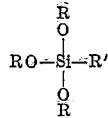

where R and R' are each a member selected from the class consisting of alkyl groups and halogenated alkyl groups, and R' in addition is a member selected from the class consisting of aryl, aralkyl, alkaryl, alkoxy, aryloxy groups, and halogenated derivatives of the aforesaid aryl, aralkyl, alkaryl, alkoxy, and aryloxy groups, (2) effecting hydrolysis of the above-deposited silicate either in situ by virtue of the presence of hydrolysis-inducing agents in the hydrolyzable silicate compound, or by external means, and (3) thereafter applying to the said treated surface the organopolysiloxane convertible to a cured, solid, elastic, organopolysiloxane. R in the above formula may be the same or different alkyl groups, and R and R' may also be the same or different alkyl groups.

One of the objects of this invention is to improve the adhesion of certain silicone rubbers to various surfaces so as to give a bond at least as strong as the cohesive forces of the silicone rubber itself.

Another object of this invention is to improve the adhesion of silicone rubbers to various metals and siliceous surfaces, such as glass and ceramics.

A still further object of the invention is to permit organopolysiloxanes containing less than 0.2 mol per cent copolymerized mono-organopolysiloxane and which are convertible to the solid elastic state to be bonded easily and quickly to metals, glass, ceramics, synthetic plastic surfaces, etc., so as to obtain a bonding zone highly resistant to deterioration at elevated temperatures and capable of remaining flexible at very low temperatures.

Other objects of this invention will become more apparent as the description thereof proceeds.

In my copending application, Serial No. 77,045 filed February 17, 1949, now U. S. Patent No. 2,601,337, and assigned to same assignee as the present invention, there is disclosed and claimed methods for improving the adhesion of various organopolysiloxanes to different types of surfaces by first priming the surface with a disilane corresponding to the general formula $(R)_nSi_2(X)_{6-n}$ where R is a monovalent hydrocarbon radical, X is a halogen and n is an integer equal to from 1 to 4, prior to applying the organopolysiloxane to the surface. Although it has been found that the usual heat-curable organopolysiloxanes prepared from liquid organopolysiloxanes condensed by condensing agents such as ferric chloride, etc., and using fillers such as titanium dioxide, lithopone, etc., adhere satisfactorily to these various surfaces, it has been found unexpectedly that if the amount of copolymerized mono-organosiloxane goes below 0.2 mol per cent, the organopolysiloxane convertible to a cured, solid, elastic state, becomes more difficult to adhere to various surfaces by means of the aforementioned disilanes as priming agents.

When silica aerogel is used as a filler in connection with organopolysiloxanes containing less than 0.2 mol per cent copolymerized mono-organopolysiloxane, the silica aerogel appears to have the property of combining with the organopolysiloxane, apparently through some residual valence, to give a product which has better tensile strength and tear resistance than similar products of organopolysiloxanes wherein the filler is, for example, titanium dioxide, iron oxide, etc. These improved properties which are believed to be due to reinforceability of the organopolysiloxane by silica aerogel, appear to be specific to that filler and the above-mentioned convertible organopolysiloxanes, which can be obtained by condensing organopolysiloxanes having a mono-organosiloxane content below 0.2 mol per cent with various condensing agents of which alkaline condensing agents, e. g. alkali-metal hydroxides, for instance, potassium hydroxide, sodium hydroxide, etc., are especially suitable. Because of the improved physical properties described above, it has been found desirable to employ this silica aerogel-filled silicone rubber in many applications. However, difficulty has been encountered in adhering to solid surfaces such filled organopolysiloxanes or other such organopolysiloxanes containing less than 0.2 mol per cent copolymerized mono-organopolysiloxane using other fillers, whether of the reinforcible or non-reinforcible type.

My invention is particularly adaptable for obviating this difficulty encountered in adhering such filled silicone rubbers to various surfaces, for example, in cases where molding is done around metal inserts or where it is attempted to mold gaskets of silica aerogel-filled (or other fillers) silicone rubbers to metallic backings or glass cloth backings, etc.

In accordance with my invention I have discovered that I am able to effect adhesion of heat-curable organopolysiloxanes containing less than 0.2 mol per cent copolymerized mono-organopolysiloxane to various solid surfaces by first priming the surface with a hydrolyzable organo-silicate of the formula described above. Thereafter by effecting hydrolysis of the silicate either in situ or by external means, it will be found that on application of the convertible, e. g., heat-curable, organopolysiloxane, for example, the silica aerogel-filled silicone rubber, good adhesion takes place and the contiguous surfaces can be molded under heat and pressure to convert the organopolysiloxane to the heat-cured, infusible, insoluble, solid, elastic state to give bonds which in many cases are stronger than the filled silicone rubbers themselves.

In the specification and in the claims, for brevity, the convertible organopolysiloxanes, which may be viscous masses or gummy solids (depending on the state of condensation), will hereinafter be referred to as "convertible organopolysiloxanes" or more specifically as "convertible methylpolysiloxanes." Although convertible organopolysiloxanes with which the present invention is concerned are now well known in the art, for purposes of showing persons skilled in the art the various convertible organopolysiloxanes which may be employed in the practice of the present invention, attention is directed to the convertible organopolysiloxanes containing less than 0.2 mol per cent (preferably the heat-convertible organopolysiloxane should be free of any copolymerized mono-organosiloxane) copolymerized mono-organosiloxane disclosed and claimed in Agens Patent 2,448,756 issued September 7, 1948, in Sprung et al. Patent 2,448,556 issued September 7, 1948, in Sprung Patent 2,484,595 issued October 11, 1949, or in Krieble et al. patent, 2,457,688 issued December 28, 1948, all the foregoing patents being assigned to the same assignee as the present invention. It will, of course, be understood by those skilled in the art that other convertible organopolysiloxanes containing the same or different silicon-bonded organic substituents (e. g., methyl, ethyl, propyl, phenyl, tolyl, xylyl, benzyl, phenylethyl, naphthyl, chlorophenyl, both methyl and phenyl, etc., radicals), connected to the silicon atoms by carbon-silicon linkages, may be employed without departing from the scope of this invention. The particular convertible organopolysiloxane used is not critical for adhesion purposes so long as it comes within the description above and is advantageously obtained from a condensation product preferably using an alkaline condensing agent, e. g., potassium hydroxide, etc.

The particular organosilicates coming within the general formula:

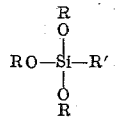

may, of course, be varied depending on the designation of R and R' in the formula. Thus, for example, R may be methyl, ethyl, propyl, isopropyl, butyl, amyl, isoamyl, octyl, iso-octyl, decyl, dodecyl, halogenated alkyls, e. g. beta-chloroethyl, etc., radicals. R' may be the same as R including halogenated derivatives of alkyl groups, as, for example, the chlorinated, brominated, fluorinated, etc., radicals, and the number of such halogens on the alkyl group may, of course, be varied, for example, from 1 to 4 or more. In addition, R' may include alkoxy and aryloxy groups corresponding to the general formula:

—OZ where Z is, for instance, an alkyl group of the same class as described above for R, or additionally Z may be an aryl, aralkyl, and alkaryl radical, for example, phenyl, tolyl, xylyl, benzyl, phenylethyl, naphthyl, anthracyl, biphenyl, etc., radicals, as well as various halogenated derivatives of these aryl, aralkyl and alkaryl radicals, attached to the silicon atom through the medium of an oxygen atom. Thus, the halogens, for example, chlorine, bromine, etc., may be attached in any position in the alkyl group or in the aryl group and may comprises any number of halogens. When halogen is attached to an alkyl group, either in the R or R' radical, it is preferable that the halogen should not be attached to the alpha carbon atom, due to the lower stability of such substituted alkyl groups.

I prefer to use organosilicates corresponding to the general formula:

(RO)$_4$Si where R is an alkyl group as defined above. It has been found that although aryl, for instance, phenyl groups, or substituted aryl groups, will give excellent bonding immediately after the press cure, there is some deterioration of the bond with further heat aging which is not encountered in connection with the use of the alkyl silicates. In addition, the bond obtained using organosilicates containing aryl groups is not as satisfactory on glass, for example, as is the case when one employs the alkyl silicates.

The fact that these particular organosilicates were effective for adhering convertible organopolysiloxanes to the various surfaces was entirely unexpected and in no way could have been predicted since it was found that similar compositions of matter, for example, hydrolyzed silicic acid, dialkyldialkoxysilanes (e. g., dimethyldipropoxysilane) and trialkylalkoxysilanes were ineffective in effecting bonding of the above-described convertible organopolysiloxanes to various surfaces. Even the use of organohalogenosilanes, for example, the use of methyltrichlorosilane or phenyltrichlorosilane was also ineffective in causing bonding when the particular chlorosilane was applied to the solid surface and hydrolyzed prior to attempting to adhere the heat-curable organopolysiloxane.

As pointed out above, it is essential that the organosilicates employed in the practice of the present invention be hydrolyzed prior to attempting to adhere the heat-curable organopolysiloxane or silicone rubber to the treated surface. This hydrolysis operation may be effected in a variety of ways. For example, when one uses ethyl silicate corresponding to the formula (C$_2$H$_5$O)$_4$Si hydrolysis of this material when applied to the surface to which it is desired to adhere the silicone rubber may be effected either by external means or by incorporating in the ethyl silicate prior to application to the surface, materials which will effect hydrolysis; for instance, acidic materials.

Thus, in one case ethyl silicate was applied to a metallic surface and the hydrolysis of this film was accomplished by treatment with acid fumes or with atmospheres of solutions of acids as, for example, hydrochloric acid or hydrogen chloride fumes, sulfuric acid, phosphoric acid, etc. In other cases hydrolysis of the organosilicate film may be caused to take place by means of acid-forming metallic salts either present on the solid surface prior to application of the organosilicate, or by adding acid-forming (i. e., with moisture) metal salts to the organosilicate as is possible for example, by the addition of anhydrous acid-forming salts containing metal ions such as, for instance, $FeCl_3$, $CuCl_2$, $AlCl_3$, $SnCl_4$, etc. In some cases it may be desirable to use heat to effect completion of the hydrolysis.

I have also found that various chlorosilanes or polyorganohalogenopolysiloxanes can be incorporated in small amounts, for example, of the order of from about 0.5 to 5%, or more in the primer, that is, in the organosilicate, prior to application to the solid surface and the moisture in the air will effect hydrolysis of the chlorosilane or polyorganohalogenopolysiloxane so that there will be liberated small amounts of hydrogen chloride which, in turn, will cause the hydrolysis of the organosilicate film. When one employs the organosilicate primer for application to tin or such non-metallic surfaces as, for example, glass or ceramic or other siliceous surfaces, it has been found necessary to incorporate an anhydrous metal salt with the primer. Lower concentrations of the metal salt, for example, anhydrous $FeCl_3$, are desirable, for example, of the order of from about 0.1 to 1%, by weight, based on the weight of the organosilicate, preferably from about 0.15 to 0.35%, by weight.

In applying the organosilicate to the surface to which it is desired to adhere the silicone rubber, it is desirable that the surface be substantially free of dirt and other oxide formations. Thereafter, the silicate either with or without the hydrolysis-inducing catalyst is then applied thereto. The surface may be then preferably blown dry with a jet of air or may be left exposed to the air for a short period of time and then subjected to an acid medium if it is to be hydrolyzed by external means. If the hydrolysis is to be effected by means of a catalyst incorporated in the organosilicate, then such additional step will, of course, be unnecessary. After hydrolysis is substantially completed, it is desirable in most instances to wash or rinse the hydrolyzed surface with water to remove any residual traces of acid. The surface is then dried to remove traces of water and the fresh convertible organopolysiloxane is then molded to the primed or treated surface at a pressure as low as possible during the curing cycle (e. g., from 10 to 25 p. s. i.) at temperatures ranging, for example, from about 100° to 150° C. for varying lengths of time, for instance, of the order of from about 5 to 15 minutes or more. After removal from the press, the molded sample is preferably given a further cure at elevated temperatures, for example, at 150° C., followed by a higher temperature, for example, for 24 hours at 250° C. to get certain optimum properties, such as compression set.

In order to accelerate the cure of the convertible organopolysiloxanes, it is desirable to add to the latter various cure accelerators, for example, benzoyl peroxide, tertiary butyl perbenzoate, etc. These cure accelerators or vulcanization accelerators, as they are also known, may be present in various amounts ranging from about 0.1 to as high as 4 to 6%, by weight, or even more of the cure accelerator, based on the weight of the organopolysiloxane.

Various fillers, of course, may be incorporated in the convertible organopolysiloxane which is reinforceable by silica aerogel. Among such fillers may be mentioned titanium dioxide, lithopone, zinc oxide, silica aerogel itself, iron oxide, etc. As pointed out previously, the invention is particularly applicable to convertible organopolysiloxanes filled with silica aerogel which up until the present time have been difficult to adhere to various surfaces. My invention obviates the difficulties heretofore encountered in connection with this particular type of heat-curable organopolysiloxane.

In order that those skilled in the art may better understand how the present invention may be practiced, the following examples are given by way of illustration and not by way of limitation. All parts are by weight. In the following examples, the heat-curable organopolysiloxane used was obtained by hydrolyzing essentially pure dimethyldichlorosilane, isolating the liquid polymer obtained as a result of this hydrolysis, and condensing the liquid organopolysiloxane with a condensing agent comprising a small amount of, for example, about 0.01% KOH until a highly viscous mass bordering on a gummy solid was obtained. This product had a ratio of approximately two methyl groups per silicon atom. The formulation used in each case was as follows:

| | Parts |
|---|---|
| Silica aerogel | 40 |
| Heat-convertible organopolysiloxane | 100 |
| Benzoyl peroxide | 1.5 |

*Example 1*

In this example a steel surface was cleaned with solvent and the oxide removed therefrom by rubbing with fine emery paper. This surface was then wiped with a mixture comprising essentially tetraethylorthosilicate containing 1%, by weight, thereof of dimethyltetrachlorodisilane. The dimethyltetrachlorodisilane was for the purpose of supplying acid (HCl from the hydrolysis of the chlorosilane) to the organosilicate to effect hydrolysis of the film. After one minute the surface was blown dry and after another minute it was rinsed well with water. The surface was again dried and the methylpolysiloxane freshened rubber compound described above was then molded to the surface with light pressure (about 25 p. s. i.) for 10 minutes at 125° C. After removing from the mold and cooling, the sample was then given a further heat treatment for one hour at 150° C. followed by 24 hours at 250° C. Examination of the bond, even after the first molding cycle, indicated that hot or cold, the bond was stronger at any stage of the molding than the cured solid elastic silicone rubber itself.

*Example 2*

A glass surface was cleaned by wiping with toluene. This surface was then coated with a thin film of t-butoxytriethoxysilane containing 0.3%, by weight, anhydrous $FeCl_3$. The film was allowed to stand for 5 minutes in moist air to become hydrolyzed and was then rinsed off thoroughly with water. The uncured silicone rubber compound, employed in Example 1 and more particularly described above, was then molded to the surface, again using light pressure (about 25–50 p. s. i.) for 10 minutes at 125° C. On removing from the mold and cooling, the bond was found to be fully developed and on subsequent heat aging in an oven for 1 hour at 150° C. and thereafter for 24 hours at 250° C., the bond continued to be stronger than the cured silicone rubber itself.

Example 3

In this example, a mixture was prepared composed of 95%, by weight, tetraethylorthosilicate and 5%, by weight, of a polyorganohalogenopolysiloxane, specifically a polymethylchloropolysiloxane, more particularly disclosed and claimed in Sauer Patent 2,421,653 issued June 3, 1947, and assigned to the same assignee as the present invention. This mixture was applied to a cleaned steel surface similarly as was done in Examples 1 and 2, and thereafter the silica aerogel-filled dimethyl silicone gum was applied and molded in the same way as described above to give a bond showing a shear strength of about 700 p. s. i. Application of the same primer and molding of the same filled silicone rubber to other surfaces such as cleaned copper and aluminum resulted in the same good bond.

When the primer in Example 3 was applied to glass, it was found preferable to add anhydrous $FeCl_3$ in a small amount (about 0.25%) to the ethyl orthosilicate in place of the polymethylchloropolysiloxane. When a glass surface was primed with this latter mixture of the $FeCl_3$ and the ethyl orthosilicate, and the same filled heat-curable methylpolysiloxane applied and molded to the treated surface, a good bond was obtained but it was found desirable after the first pressing and curing cycle, that is, at the temperature of about 125° C. for 10 minutes, to cool the molded article to room temperature before further heat aging or heat curing of the total assembly at elevated temperatures, for example, at 150° C. or 250° C. as described above. If this latter heat aging operation was conducted without resorting to prior room temperature cooling, it was found that the bond obtained after the final heat aging was inferior to the bond obtained when this cooling to room temperature took place.

Example 4

In this example the same ingredients and procedure were employed as in Example 2 with the exception that instead of tetraethylorthosilicate, a similar amount of methyltripropoxysilane was used. The bond obtained in this case was satisfactory and even when heat-aged at elevated temperatures, it showed no evidence of deterioration but rather the bond appeared to be stronger than the rest of the molded silicone rubber.

Example 5

In this example tetraethylorthosilicate was applied to a cleaned steel surface. Thereafter the surface was exposed to hydrogen chloride fumes, to effect hydrolysis of the surface. The treated surface was then rinsed thoroughly with water to remove any traces of residual HCl or other contaminants and a sample of the heat-curable silicone gum containing the silica aerogel and benzoyl peroxide described in Example 1 was applied and molded in the same manner as described in the aforementioned Example 1. At the end of the first molding cycle the bond was found to be satisfactory and continued to be at least as strong and in some cases stronger than the rest of the molded sample even when heat-aged at elevated temperatures of the order of 250° C. for 24 hours.

Example 6

In this example, steel surfaces which had previously been substantially cleaned of contaminants and oxide formations were treated with various organosilicates coming within the scope of the general formula found in column 1. These compounds included beta-chloroethylorthosilicate, t-butoxytriethoxysilane, t-amyloxytriethoxysilane, di-t-amyloxydiethoxysilane, di-n-butoxydiethoxysilane, n-butoxytriethoxysilane, 2-methoxyethylorthosilicate, $[(CH_3OC_2H_5O)_4Si]$ di-t-butoxydiethoxysilane, methyltributoxysilane, methyltripropoxysilane, methyltriisopropoxysilane, di-t-butoxydiphenoxysilane, orthochlorophenylorthosilicate. Each of the organosilicates containing about 0.25%, by weight, anhydrous $FeCl_3$, based on the weight of the silicate, was applied to the cleaned steel surface, and the surface permitted to stand in the air for about 12 hours to permit the moisture in the air to effect hydrolysis of the silicate film in combination with the $FeCl_3$. Thereafter, each surface was rinsed with water to remove traces of residual HCl, and finally dried. To these primed surfaces there was applied the same filled heat-curable methylpolysiloxane employed in Examples 1 and 2 and the total assemblies molded using the same conditions as described in the aforementioned Example 1. At the end of the final heat treatment for 24 hours at 250° C., it was found that in each case (with the exception of the sample using di-t-butoxydiphenoxysilane which showed a good bond after initial cure but did not heat-age as well) a strong bond was obtained wherein the bond was at least as strong as the rest of the molded silicone rubber, and in many cases even stronger than the latter.

It will, of course, be understood by those skilled in the art that organosilicates other than those employed in the foregoing examples as well as other concentrations of the organosilicates and the hydrolysis-inducing materials required to effect hydrolysis of the organosilicates may also be employed without departing from the scope of the invention. Variations in concentration of the hydrolysis-inducing agent may depend on such factors as organosilicate used, solid surface to which adhesion is desired, hydrolysis-inducing catalyst employed, etc. It will also be apparent that I may employ other fillers (e. g., diatomaceous earth, titanium dioxide, lithopone, iron oxide, etc.) and convertible organopolysiloxanes of the type described previously herein and also in Hyde Patent 2,490,357 issued December 6, 1949, and in Marsden Patent 2,521,528 issued September 5, 1950, the latter patent being assigned to the same assignee. In addition, the particular heat-convertible organopolysiloxane (which may be in a highly viscous, gummy state) reinforcible by silica aerogel, besides having been condensed by means of potassium hydroxide may have been condensed by other condensing agents, examples of which have been given previously.

Finally, instead of using a polymeric diorganosiloxane, as, for example, the polymeric dimethyl siloxane, containing about 2.0 organic, e. g., methyl, groups per silicon atom, organopolysiloxanes containing up to at most 0.2 mol percent copolymerized mono-organosiloxane, for example, copolymerized monomethyl siloxane, may also be used in the present instance. Generally, I prefer that the organopolysiloxane from which the heat-curable organopolysiloxane is prepared, contain about 1.998 to 2.0 inclusive, especially two, organic groups, for example, methyl groups, per silicon atom, and that more than 98 per cent, e. g., 99.8 per cent of the silicon atoms in the polysiloxane contain two silicon-bonded organic groups, for instance, alkyl groups or mixtures of alkyl and aryl groups, for example, methyl groups, methyl and aryl groups, etc.

In connection with effecting adhesion of the convertible organopolysiloxanes, I have found that t-butoxytriethoxysilane was particularly effective in adhering silicone rubber to magnesium. The use of this particular organosilicate gave stronger bonds than when other organosilicates were employed. Good bonding to magnesium was obtained, however, using ethyl silicate with higher concentrations (e. g., 1.5 to 2 per cent) of hydrolysis-inducing catalysts, e. g., FeCl₃, etc.

My invention is equally applicable for adhering the covertible organopolysiloxanes to other glass surfaces as, for example, to glass tape, glass fibers, glass fiber sheets, etc. In the latter instance, glass cloth made from glass fibers was primed with a mixture comprising tetraethylorthosilicate and a small amount of anhydrous FeCl₃ in the manner described above in the foregoing examples, and thereafter a heat-curable organopolysiloxane filled with silica aerogel was adhered satisfactorily employing the technique and ingredients described in the foregoing examples. The bond realized in this case was so strong that after heat-curing, attempts to pull the cured silicone rubber from the glass backing resulted in tearing of the glass fibers themselves indicating the bond was stronger than the silicone rubber.

My invention is applicable to almost all metal surfaces and is not specific as regards the particular metal to which adherence may be desired. In this respect it differs from the techniques described and claimed in my foregoing copending application, Serial No. 77,045, which are specific to most metallic and ceramic or siliceous surfaces other than copper.

The present invention is useful in adhering silicone rubbers to various metal surfaces as well as to various siliceous, for example, glass or ceramic surfaces. It can be used to bond silicone rubber to magnesium window frames or to any other type of metallic window frame where it is desired to obtain a surface resistant to cold and heat, as well as to deterioration by the elements. In addition, electrical conductors, for example, copper conductors, can be passed through a priming solution of the particular organosilicate employed and thereafter insulated, for example, by extrusion over the said conductor, with the silicone rubber generically described herein and cured at elevated temperatures to give a tightly adherent insulating coating.

In addition, it is possible to make seals for various types of equipment including vacuum seals for pumpless power rectifiers as is more particularly described in my aforementioned copending application. In this connection my invention is particularly adaptable for sealing the casings containing anodes and cathodes found in electrical discharge devices.

Finally, my invention has eminent utility in molding heat-curable silicone rubber of the type described herein around steel inserts to get a good bond to the steel. Heretofore, attempts to use all kinds of priming agents were entirely unsatisfactory because most of the time it was found that there was little if any bond induced between the insert and the heat-curable organopolysiloxane. It was therefore essential that a new process had to be developed for adhering the particular silicone rubbers reinforcible by silica aerogel described herein since prior methods for adhering this particular type of filled silicone rubber were unsatisfactory.

What I claim as new and desire to secure by Letters Patent of the United States is:

1. The process for improving the adhesion to a solid surface of an organopolysiloxane convertible to the solid, elastic state and containing less than 0.2 mol per cent copolymerized mono-organosiloxane, which process comprises treating the said surface with a composition comprising an organosilicate corresponding to the general formula:

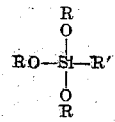

where R is a member selected from the class consisting of alkyl groups and halogen-substituted alkyl groups, and R' is a member selected from the class consisting of alkyl, aryl, aralkyl, alkaryl, alkoxy, aryloxy groups, and halogenated derivatives of the aforesaid alkyl, aryl, aralkyl, arkaryl, alkoxy and aryloxy groups, and thereafter applying the aforesaid organopolysiloxane to the surface and heat-treating the latter until a solid, elastic product is obtained.

2. The process for improving the adhesion to a solid surface of an organopolysiloxane convertible to the solid, elastic state and containing less than 0.2 mol per cent copolymerized mono-organosiloxane, which process comprises treating the said surface prior to applying the organopolysiloxane with a composition comprising tetraethyl silicate, and thereafter applying the aforesaid organopolysiloxane to the treated surface and heat-treating the latter until a solid, elastic product is obtained.

3. The process for improving the adhesion to a solid surface of an organopolysiloxane convertible to the solid, elastic state and containing less than 0.2 mol per cent copolymerized mono-organosiloxane, which process comprises treating the said surface prior to applying the organopolysiloxane with a composition comprising t-butoxytriethoxysilane, and thereafter applying the aforesaid organopolysiloxane to the surface and heat-treating the latter until a solid, elastic product is obtained.

4. The process for improving the adhesion to a solid surface of an organopolysiloxane convertible to the solid, elastic state and containing less than 0.2 mol per cent copolymerized mono-organosiloxane, which process comprises treating the said surface prior to applying the organopolysiloxane with a composition comprising methyl triethoxysilane, and thereafter applying the aforesaid organopolysiloxane to the surface and heat-treating the latter until a solid, elastic product is obtained.

5. The process for improving the adhesion to a solid surface of an organopolysiloxane convertible to the solid, elastic state and containing less than 0.2 mol per cent copolymerized mono-organosiloxane, which process comprises treating the said surface prior to applying the organopolysiloxane with a composition comprising beta-chloroethylorthosilicate, and thereafter applying the aforesaid organopolysiloxane to the surface and heat-treating the latter until a solid, elastic product is obtained.

6. The process for improving the adhesion to a solid surface of an organopolysiloxane convertible to the solid, elastic state and containing less than 0.2 mol per cent copolymerized mono-organosiloxane, which process comprises treating the said surface prior to applying the organopolysiloxane with a composition comprising di-t-amyloxydiethoxysilane, and thereafter applying the aforesaid organopolysiloxane to the surface and heat-treating the latter until a solid, elastic product is obtained.

7. The process for improving the adhesion to a solid surface of a methylpolysiloxane heat-curable to the solid, elastic state and containing less than 0.2 mol per cent copolymerized monomethylsiloxane, which process comprises treating the said surface with tetraethyl silicate, and thereafter applying the aforesaid methylpolysiloxane to the surface and heat-treating the latter until a solid, elastic product is obtained.

8. The process for improving the adhesion to a solid surface of a methylpolysiloxane heat-curable to the solid, elastic state and containing less than 0.2 mol per cent copolymerized monomethylsiloxane, which process comprises treating the said surface with t-butoxytriethoxysilane, and thereafter applying the aforesaid methylpolysiloxane to the surface and heat-treating the latter until a solid, elastic product is obtained.

9. The process for improving the adhesion to a solid surface of a methylpolysiloxane heat-curable to the solid, elastic state and containing less than 0.2 mol per cent copolymerized monomethylsiloxane, which process comprises treating the said surface with methyl triethoxysilane, and thereafter applying the aforesaid methylpolysiloxane to the surface and heat-treating the latter until a solid, elastic product is obtained.

10. The process for improving the adhesion to a solid surface of a methylpolysiloxane heat-curable to the solid, elastic state and containing less than 0.2 mol per cent copolymerized monomethylsiloxane, which process comprises treating the said surface with beta-chloroethylorthosilicate, and thereafter applying the aforesaid methylpolysiloxane to the surface and heat-treating the latter until a solid elastic product is obtained.

11. The process for improving the adhesion to a solid surface of a methylopolysiloxane heat-curable to the solid, elastic state and containing less than 0.2 mol per cent copolymerized monomethylsiloxane, which process comprises treating the said surface with di-t-amyloxydiethoxysilane, and thereafter applying the aforesaid methylpolysiloxane to the surface, and heat-treating the latter until a solid, elastic product is obtained.

12. The process as in claim 7 wherein the ethyl silicate used to treat the surface contains a small amount of an anhydrous iron halide incorporated therein.

13. The process as in claim 8 wherein the t-butoxytriethoxysilane used to treat the surface contains a small amount of an anhydrous iron halide incorporated therein.

14. The process as in claim 9 wherein the methyl triethoxysilane used to treat the surface contains a small amount of an anhydrous iron halide incorporated therein.

15. The process as in claim 10 wherein the beta-chloroethylorthosilicate used to treat the surface contains a small amount of an iron halide incorporated therein.

16. The process as in claim 11 wherein the di-t-amyloxydiethoxysilane used to treat the surface contains a small amount of an anhydrous iron halide incorporated therein.

17. An article of manufacture comprising (1) a solid surface primed with a hydrolyzed composition comprising an organosilicate corresponding to the general formula:

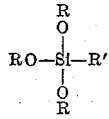

where R is a member selected from the class consisting of alkyl groups and halogen-substituted alkyl groups and R′ represents a member selected from the class consisting of alkyl, aryl, aralkyl, alkaryl, alkoxy, aryloxy groups, and halogenated derivatives of the aforesaid alkyl, aryl, aralkyl, alkaryl, alkoxy and aryloxy groups, and (2) an adherent layer comprising a solid, elastic organopolysiloxane containing less than 0.2 mol per cent co-polymerized mono-organosiloxane bonded firmly to the primed solid surface.

18. An article of manufacture comprising (1) a metallic surface primed with a hydrolyzed composition comprising (a) ethyl orthosilicate and (b) an anhydrous iron halide, and (2) an adherent layer comprising a solid, elastic methylpolysiloxane containing less than 0.2 mol per cent co-polymerized monomethylsiloxane.

19. An article of manufacture comprising (1) a magnesium surface primed with a hydrolyzed composition comprising (a) ethyl orthosilicate and (b) a small amount of an anhydrous iron halide, and (2) an adherent layer comprising a solid, elastic methylpolysiloxane containing less than 0.2 mol per cent co-polymerized monomethylsiloxane bonded firmly to the primed magnesium surface.

20. An article of manufacture comprising (1) a glass surface primed with a hydrolyzed composition comprising (a) ethyl orthosilicate and (b) a small amount of an anhydrous iron halide, and (2) an adherent layer comprising a solid, elastic methylpolysiloxane containing less than 0.2 mol per cent copolymerized monomethylsiloxane bonded firmly to the primed glass surface.

21. An article of manufacture comprising (1) a metallic surface primed with a hydrolyzed composition comprising (a) t-butoxytriethoxysilane and (b) a small amount of an anhydrous iron halide, and (2) an adherent layer comprising a solid, elastic methylpolysiloxane containing less than 0.2 mol per cent copolymerized monomethylsiloxane bonded firmly to the primed metallic surface.

22. An article of manufacture comprising (1) glass cloth primed with a hydrolyzed composition comprising (a) ethyl orthosilicate and (b) a small amount up to at most 1%, by weight, of anhydrous ferric chloride, and (2) an adherent layer comprising a heat-cured solid, elastic methylpolysiloxane containing less than 0.2 mol per cent copolymerized monomethylsiloxane bonded firmly to the primed glass cloth surface.

23. A composition of matter consisting solely of (1) an organosilicate corresponding to the general formula:

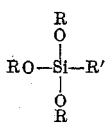

where R is a member selected from the class consisting of alkyl groups and halogen-substituted alkyl groups and R' represents a member selected from the class consisting of alkyl, aryl, aralkyl, alkaryl, alkoxy, aryloxy groups, and halogenated derivatives of the aforesaid alkyl, aryl, aralkyl, alkaryl, alkoxy and aryloxy groups, and (2) a small amount of an iron halide.

24. A composition of matter consisting solely of (1) ethyl orthosilicate and (2) anhydrous ferric chloride.

25. A composition of matter consisting solely of (1) t-butoxytriethoxysilane and (2) a small amount of ferric chloride.

26. A composition of matter consisting solely of (1) methyl triethoxysilane and (2) a small amount of anhydrous ferric chloride.

27. A composition of matter consisting solely of (1) beta-chloroethylorthosilicate and (2) a small amount of anhydrous ferric chloride.

28. A composition of matter consisting solely of (1) di-t-amyloxydiethoxysilane and (2) a small amount of anhydrous ferric chloride.

29. The hydrolyzed product of the composition defined in claim 23.

30. The hydrolyzed product of the composition defined in claim 24.

31. The hydrolyzed product of the composition defined in claim 25.

32. The process for obtaining a solid surface to which is tenaciously adhered a cured, solid, elastic organopolysiloxane, which process comprises (1) applying to a solid surface, a filled organopolysiloxane convertible to the cured, solid, elastic state and containing less than 0.2 mol per cent of copolymerized mono-organosiloxane, in which filled organopolysiloxane there is incorporated a curing agent, the said solid surface containing thereon, prior to application of the filled organopolysiloxane, a composition comprising a hydrolysis product of an organosilicate corresponding to the general formula:

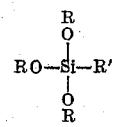

where R is a member selected from the class consisting of alkyl groups and halogen-substituted alkyl groups, and R' is a member selected from the class consisting of alkyl, aryl, aralkyl, alkaryl, alkoxy, aryloxy groups, and halogenated derivatives of the aforesaid alkyl, aryl, aralkyl, alkaryl, alkoxy, and aryloxy groups, and (2) thereafter heating the applied organopolysiloxane at an elevated temperature until a cured, solid, elastic product is obtained, and a tenacious bond is attained between the solid surface and the cured organopolysiloxane.

ROBERT SMITH-JOHANNSEN.

References Cited in the file of this patent

UNITED STATES PATENTS

| Number | Name | Date |
|---|---|---|
| 2,389,477 | Wright et al. | Nov. 20, 1945 |
| 2,436,304 | Johannson | Feb. 17, 1948 |
| 2,452,416 | Wright | Oct. 26, 1948 |
| 2,464,231 | Hersh | Mar. 15, 1949 |
| 2,485,928 | Servais | Oct. 25, 1949 |
| 2,502,286 | Sowa | Mar. 28, 1950 |

OTHER REFERENCES

Sauer, "Journal of Amer. Chem. Society," 68, pp. 138–139 (1946).